(12) United States Patent
Nakajima et al.

(10) Patent No.: US 11,077,829 B2
(45) Date of Patent: *Aug. 3, 2021

(54) AUTHENTICATION INFORMATION PROVIDING SERVER, AUTHENTICATION INFORMATION PROVIDING METHOD, DELIVERY USER TERMINAL, AND LOCKING AND UNLOCKING METHOD

(71) Applicant: TOYOTA JIDOSHA KABUSHIKI KAISHA, Toyota (JP)

(72) Inventors: Etsuko Nakajima, Nagoya (JP); Naoki Uenoyama, Nisshin (JP); Junya Masui, Nagoya (JP); Akira Hoshino, Nagoya (JP); Hideo Hasegawa, Nagoya (JP); Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,533

(22) Filed: Apr. 17, 2020

(65) Prior Publication Data

US 2020/0238951 A1 Jul. 30, 2020

Related U.S. Application Data

(63) Continuation of application No. 16/212,726, filed on Dec. 7, 2018, now Pat. No. 10,661,753.

(30) Foreign Application Priority Data

Dec. 12, 2017 (JP) .............................. JP2017-237760

(51) Int. Cl.
*B60R 25/24* (2013.01)
*G06Q 50/28* (2012.01)
*B60R 25/01* (2013.01)

(52) U.S. Cl.
CPC .............. *B60R 25/24* (2013.01); *B60R 25/01* (2013.01); *G06Q 50/28* (2013.01); *B60R 2325/10* (2013.01); *B60R 2325/205* (2013.01)

(58) Field of Classification Search
CPC ..... B60R 25/24; B60R 25/01; B60R 2325/10; B60R 2325/205; G06Q 50/28; H04W 12/06; H04W 4/80; H04L 63/08
(Continued)

(56) References Cited

U.S. PATENT DOCUMENTS 10,310,500 B1 6/2019 Brady
2018/0240067 A1* 8/2018 Oz ........................ G06F 16/951
(Continued)

FOREIGN PATENT DOCUMENTS

GB 2558601 A 7/2018
JP 2006-206225 A 8/2006

*Primary Examiner* — Hirdepal Singh
(74) *Attorney, Agent, or Firm* — Oblon, McClelland, Maier & Neustadt, L.L.P.

(57) ABSTRACT

An authentication information providing server includes: a memory configured to store information about vehicles associated with a recipient of a package as a place of delivery, and store pieces of authentication information corresponding to lock/unlock devices each configured to lock or unlock a corresponding one of predetermined compartments of the vehicles; and a processor configured to issue the authentication information to a delivery user terminal based on a request from the delivery user terminal, the delivery user terminal being used by a user who delivers the package, and, when there is a request from the delivery user terminal to set a place of delivery of the package to a vehicle different from a first one of the vehicles, corresponding to the authentication information issued first by the processor, issue the authentication information corresponding to a second one of the vehicles, different from the first one.

3 Claims, 7 Drawing Sheets

(58) Field of Classification Search
 USPC .......................................................... 340/5.61
 See application file for complete search history.

(56) References Cited

U.S. PATENT DOCUMENTS

| | | |
|---|---|---|
| 2019/0034858 A1 | 1/2019 | Ferguson |
| 2019/0102728 A1 | 4/2019 | Lee |
| 2019/0143872 A1 | 5/2019 | Gil |
| 2019/0220000 A1* | 7/2019 | Ibe .................... G01C 21/3492 |
| 2020/0012998 A1* | 1/2020 | Gillen .................... G06Q 50/28 |

* cited by examiner

FIG. 3

| CLIENT USER ID | DELIVERY DATE | PLACE OF DELIVERY | DELIVERY STATUS | PACKAGE ATTRIBUTE |
|---|---|---|---|---|
| S001 | 2017/11/01 | VEHICLE | COMPLETED | ・・・ |
| S001 | 2017/11/02 | VEHICLE | COMPLETED | ・・・ |
| S001 | 2017/11/03 | VEHICLE | NOT COMPLETED | ・・・ |

FIG. 4

| CLIENT USER ID | VEHICLE TYPE | COLOR | LICENSE NUMBER | VEHICLE LOCATION | PRIORITY |
|---|---|---|---|---|---|
| S001 | ・・・ | WHITE | XXYY | ・・・ | 1 |
| S001 | ・・・ | WHITE | XXZZ | ・・・ | 2 |

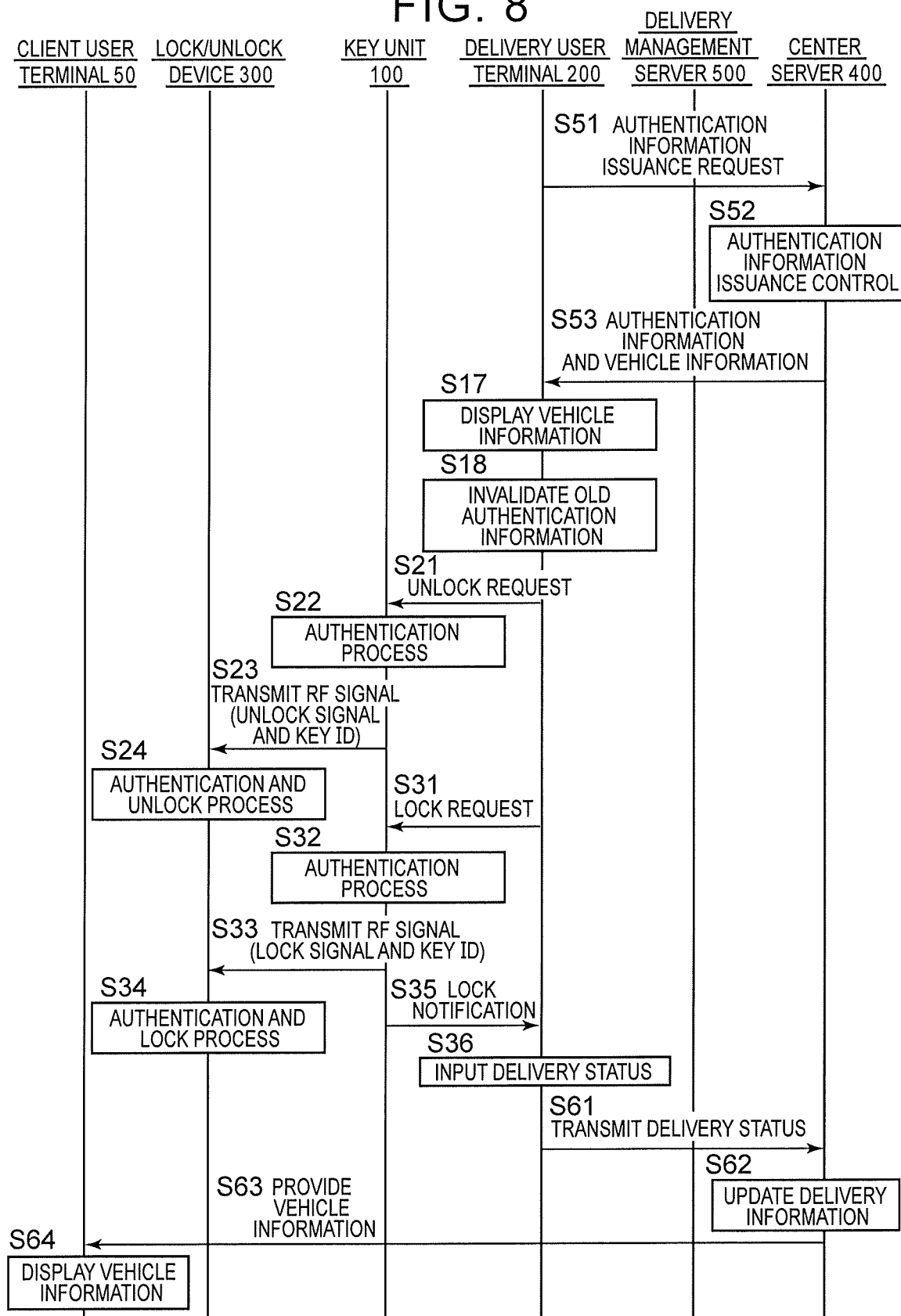

AUTHENTICATION INFORMATION PROVIDING SERVER, AUTHENTICATION INFORMATION PROVIDING METHOD, DELIVERY USER TERMINAL, AND LOCKING AND UNLOCKING METHOD

INCORPORATION BY REFERENCE

This application is a continuation of U.S. patent application Ser. No. 16/212,726 filed Dec. 7, 2018, which claims the benefit of Japanese Priority Patent Application No. 2017-237760 filed on Dec. 12, 2017 including the specification, drawings and abstract is incorporated herein by reference in its entirety.

BACKGROUND

1. Technical Field

The disclosure relates to an authentication information providing server, an authentication information providing method, a delivery user terminal, and a locking and unlocking method.

2. Description of Related Art

In recent years, development of a delivery system that uses a luggage compartment of a vehicle, which is specified by a client of a delivery service, as a place of transfer has been proceeding as a means of efficiently transferring a package between the client and a delivery person. For example, Japanese Unexamined Patent Application Publication No. 2006-206225 (JP 2006-206225 A) suggests a system in which, at the time when a user who delivers a package (hereinafter, also referred to as delivery user) delivers a package, an authentication process is caused to be executed between a terminal that the delivery user uses (hereinafter, also referred to as delivery user terminal) and a vehicle communication device mounted on a specified vehicle, and, when the authentication is successful, the specified vehicle is allowed to be locked or unlocked.

SUMMARY

When the client of the delivery service (hereinafter, also referred to as client user) has specifies the luggage compartment of the vehicle as a place of transfer of the package, if the vehicle specified as a delivery destination moves before the delivery user delivers the package, it is difficult for the delivery user to deliver the package to such a vehicle. When there is an obstacle around a luggage door of the vehicle specified as the delivery destination and it is not possible to open a luggage compartment door as well, it is difficult to deliver the package to such a vehicle. When the delivery user brings back the package in such a case, the necessity of redelivery occurs.

The disclosure provides a system that is able to obtain a larger number of opportunities to deliver a package.

An aspect of the disclosure relates to an authentication information providing server. The authentication information providing server includes a memory and a processor. The memory is configured to store information about a plurality of vehicles associated with a recipient of a package as a place of delivery of the package. The memory is configured to store pieces of authentication information corresponding to lock and unlock devices, each of lock and unlock devices is configured to lock or unlock a corresponding one of predetermined compartments of the plurality of vehicles. The processor is configured to issue the authentication information stored in the memory to a delivery user terminal based on a request from the delivery user terminal. The delivery user terminal is used by a user who delivers the package. The processor is configured to issue the authentication information corresponding to a second one of the plurality of vehicles when there is a request from the delivery user terminal to set a place of delivery of the package to a vehicle different from a first one of the plurality of vehicles, corresponding to the authentication information issued first by the processor. The second one of the plurality of vehicles is different from the first one of the plurality of vehicles.

The predetermined compartment provided inside the vehicle is locked or unlocked, so access of the delivery user to the predetermined compartment is controlled. Examples of the predetermined compartment may include a trunk (luggage compartment) of each of the vehicles, and a passenger compartment, such as a passenger seat, of each of the vehicles. In order to lock or unlock the predetermined compartment, the delivery user is required to get the authentication information issued from the processor to the delivery user terminal.

Even when the authentication information corresponding to the first one of the plurality of vehicles has been issued, it is conceivable that the delivery user is not able to deliver the package to the predetermined compartment of the first one of the plurality of vehicles. For example, the first one of the plurality of vehicles has moved or the delivery user is not able to open the door of the predetermined compartment of the first one of the vehicles. In this case, when the predetermined compartments of the plurality of vehicles are usable as a place of delivery, it may be possible to deliver a package to the predetermined compartment of the second one of the plurality of vehicles, different from the first one of the plurality of vehicles. That is, when it is possible to issue the authentication information corresponding to each of the plurality of vehicles, it is possible to ensure a larger number of places of delivery of a package, so it is possible to obtain a larger number of opportunities to deliver a package. The first one and the second one each are any one of the plurality of vehicles associated with the same recipient of a package. The number of the plurality of vehicles may be three or more. The pieces of authentication information corresponding to the plurality of vehicles associated with the recipient of a package are stored in the memory, and the processor issues any piece of the authentication information.

The processor may be configured to, as the processor receives, from the delivery user terminal, a signal indicating that the package has been delivered to the second one of the plurality of vehicles, inform a terminal that is used by the recipient that the package has been delivered to the second one of the plurality of vehicles.

The recipient is allowed to easily identify which vehicle the package has been delivered to based on this information.

Another aspect of the disclosure relates to an authentication information providing method. The authentication information providing method includes: storing, by an authentication information providing server, information about a plurality of vehicles associated with a recipient of a package as a place of delivery of the package; storing, by the authentication information providing server, pieces of authentication information corresponding to lock and unlock devices, each of lock and unlock device is configured to lock or unlock a corresponding one of predetermined compartments of the plurality of vehicles; issuing, by the authentication information providing server, the stored authentication information to a delivery user terminal based on a request from the delivery user terminal, the delivery user terminal being used by a user who delivers the package; and, issuing, by the authentication information providing server, the authentication information corresponding to a second one of the plurality of vehicles when there is a request from the delivery user terminal to set a place of delivery of the package to a vehicle different from a first one of the plurality of vehicles, corresponding to the authentication information issued first. The second one of the plurality of vehicle is different from the first one of the plurality of vehicles.

Further another aspect of the disclosure relates to a delivery user terminal. The delivery user terminal is used by a user who delivers a package. The delivery user terminal includes a processor. The processor is configured to transmit, to an authentication server, a request to set a place of delivery of the package to a vehicle different from a first one of a plurality of vehicles associated with a recipient of the package as a place of delivery of the package. Authentication information for locking or unlocking a corresponding one of predetermined compartments of the plurality of vehicles is assigned to each of the plurality of vehicles. The first one of the plurality of vehicles corresponds to the authentication information received first. The processor is configured to receive, from the authentication server, the authentication information corresponding to a second one of the plurality of vehicles, different from the first one of the plurality of vehicles. The processor is configured to lock or unlock the predetermined compartment of the second one of the plurality of vehicles with the use of the authentication information corresponding to the second one of the plurality of vehicles.

Further another aspect of the disclosure relates to a locking and unlocking method. The locking and unlocking method is executed by a delivery user terminal that is used by a user who delivers a package. The locking and unlocking method includes: transmitting, by the delivery user terminal, to an authentication server, a request to set a place of delivery of the package to a vehicle different from a first one of a plurality of vehicles associated with a recipient of the package as a place of delivery of the package, authentication information for locking or unlocking a corresponding one of predetermined compartments of the plurality of vehicles being assigned to each of the plurality of vehicles, the first one of the plurality of vehicles corresponding to the authentication information received first; receiving, by the delivery user terminal, from the authentication server, the authentication information corresponding to a second one of the plurality of vehicles, different from the first one of the plurality of vehicles; and locking or unlocking, by the delivery user terminal, the predetermined compartment of the second one of the plurality of vehicles with the use of the authentication information corresponding to the second one of the plurality of vehicles.

In this case, the locking and unlocking method may further include, as the delivery user terminal receives the authentication information corresponding to the second one of the plurality of vehicles, invalidating, by the delivery user terminal, the authentication information corresponding to the first one of the plurality of vehicles.

With this configuration, when it is possible to access the predetermined compartment of the second one of the plurality of vehicles, it is not possible to access the predetermined compartment of the first one of the plurality of vehicles, so it is possible to reduce concerns about security.

The delivery user terminal may invalidate the authentication information corresponding to the first one of the plurality of vehicles in response to an instruction from the server, or the like, or may invalidate the authentication information corresponding to the first one of the plurality of vehicles as the delivery user terminal receives the authentication information corresponding to the second one of the plurality of vehicles.

According to the aspects of the disclosure, it is possible to obtain a larger number of opportunities to deliver a package.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a view that shows an example of the configuration of a delivery information table;

FIG. 4 is a view that shows an example of the configuration of a vehicle management information table;

FIG. 8 is a view that shows the flow of operations of the delivery management system at the time when authentication information is issued to the delivery user terminal.

DETAILED DESCRIPTION OF EMBODIMENTS

Hereinafter, specific embodiments of the disclosure will be described with reference to the accompanying drawings. The sizes, materials, shapes, relative arrangement, and the like, of components described in the present embodiments do not intend to limit the technical scope unless otherwise specified.

First Embodiment

Outline of System

Figure 1:
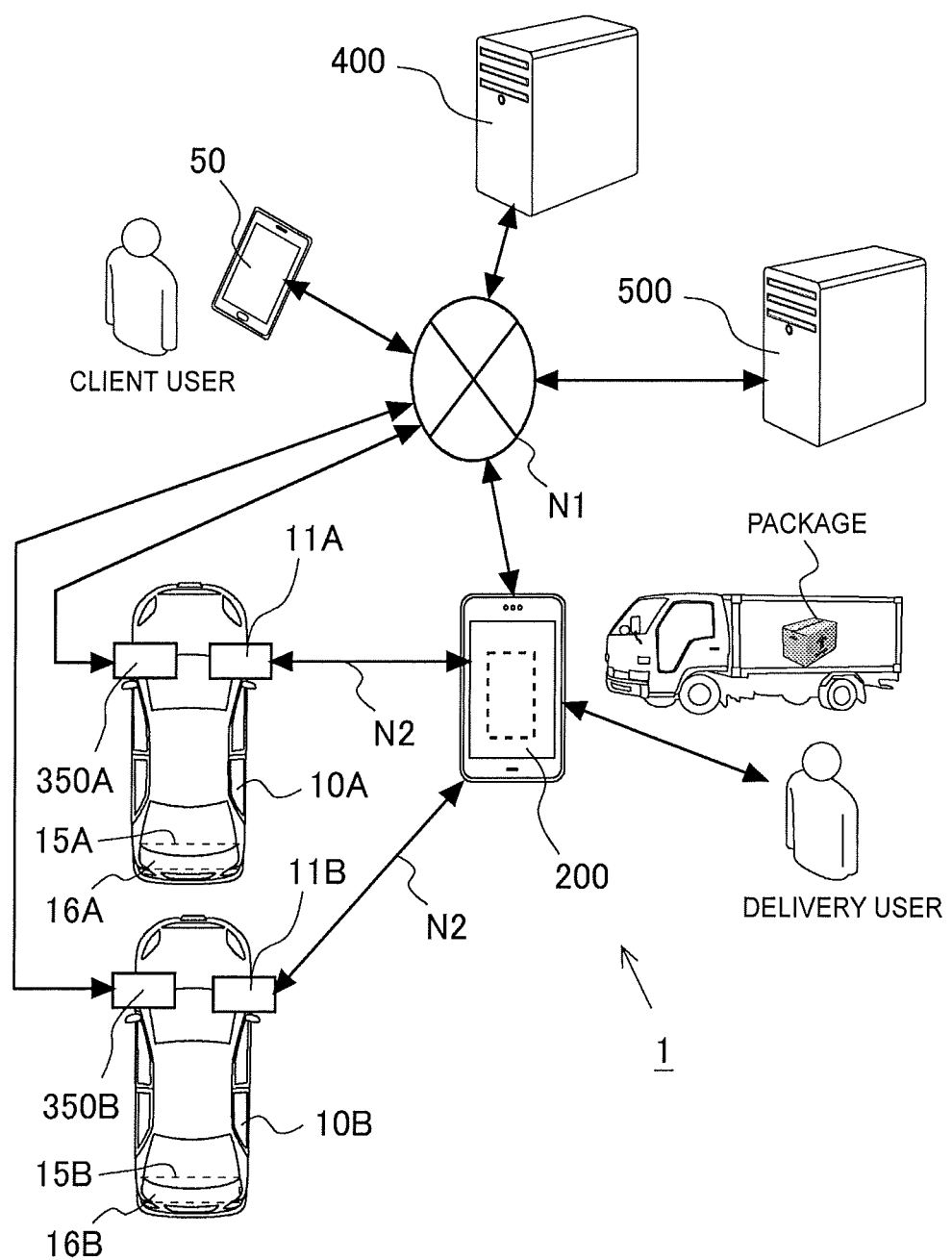
FIG. 1 is a diagram that shows the schematic configuration of a delivery management system including an authentication information providing server according to an embodiment.

FIG. 1 is a diagram that shows the schematic configuration of a delivery management system 1 according to the present embodiment. The delivery management system 1 is a system for a delivery service. The delivery service uses any one of luggage compartments 15 (trunks) of vehicles 10 as a place of delivery by allowing the shared use of the luggage compartment 15 between a client who requests delivery of a package and a person that delivery of the package has been requested of. The any one of the luggage compartments 15 is specified by the client. The delivery management system 1 includes two vehicles (a first vehicle 10A and a second vehicle 10B) as an example. Alternatively, the delivery management system 1 may include three or more vehicles. When the vehicles are collectively referred to in the specification, the vehicles are denoted by reference numeral 10. When the components of the first vehicle 10A and second vehicle 10B are distinguished from each other, the components of the first vehicle 10A are denoted by numerals with a suffix of A, such as luggage compartment 15A, and the components of the second vehicle 10B are denoted by numerals with a suffix of B, such as luggage compartment 15B. On the other hand, when the components of the first vehicle 10A and second vehicle 10B are collectively referred to, the components are denoted by reference numerals without suffixes. Hereinafter, a person who requests delivery of a package is referred to as client user, and a person that delivery of a package has been requested of is referred to as delivery user. Each luggage compartment 15 is a predetermined compartment inside the vehicle 10. A package to be delivered is placeable in the predetermined compartment. The predetermined compartment is configured to be locked or unlocked by a corresponding in-vehicle device 11 (described later). The luggage compartment 15 is a space separated from a passenger compartment in which a driver, and the like, of the vehicle 10 are seated such that the luggage compartment 15 and the passenger compartment are inaccessible to each other. A luggage compartment door 16 is provided for each luggage compartment 15. The luggage compartment door 16 is able to be opened or closed from the outside of the vehicle 10.

In the example of FIG. 1, the delivery management system 1 includes the in-vehicle devices 11A, 11B, a delivery user terminal 200, a client user terminal 50, a center server 400, and a delivery management server 500. The in-vehicle device 11A is installed in the first vehicle 10A. The in-vehicle device 11B is installed in the second vehicle 10B. The in-vehicle devices 11, the delivery user terminal 200, the client user terminal 50, the center server 400, and the delivery management server 500 are connected to one another by a network N1. The network N1 is a worldwide public telecommunication network, such as the Internet. A wide area network (WAN) or another communication network may be employed as the network N1. The network N1 may include a telephone communication network, such as a mobile telephone network, and a wireless communication network, such as Wi-Fi. Each in-vehicle device 11 is connected to the delivery user terminal 200 via a corresponding network N2. Examples of the network N2 include a short-range wireless communication network. The delivery user terminal 200 is a terminal that the delivery user uses. The delivery management system 1 includes the single delivery management server 500 as an example. Alternatively, the delivery management system 1 may include two or more delivery management servers.

The delivery management server 500 accepts registration of an article to be delivered (hereinafter, also referred to as package) from the client user terminal 50. The client user terminal 50 is a terminal that the client user uses. For example, when the client user asks the delivery user to deliver an article, purchased on an online shopping site set up by an electronic commerce operator, as a package, the client user is allowed to register delivery information and vehicle management information into the delivery management server 500 with the use of an application (hereinafter, referred to as predetermined application). The delivery information is concerned with the package. The vehicle management information is used when a place of delivery of the package is set to any one of the vehicles 10. The application is installed in the client user terminal 50 to use the service that is provided by the delivery management system 1. As shown in FIG. 3 (described later), the delivery information includes identification information of the client user, delivery schedule information, and the like. The identification information of the client user is also associated in advance with the vehicles 10 associated with the client user in the delivery management server 500. The client user selects a place of delivery to use as needed from among candidates of a place of delivery concerned with the client user, including the vehicles 10. The selected place of delivery is also included in the delivery information. Hereinafter, the description will proceed on the assumption that the place of delivery, selected by the client user, is set to any one of the vehicles 10. The delivery information further includes information about the status of a package. Information about whether delivery of a package has completed, or the like, is illustrated as the status information. As shown in FIG. 4 (described later), the vehicle management information includes information for identifying each of the vehicles 10, information that associates the client user with the vehicles 10, and the like.

As the delivery management server 500 accepts a request to deliver a package from the client user terminal 50, and when the place of delivery of the package is any one of the vehicles 10, the delivery management server 500 makes a request of the center server 400 to transmit authentication information to the delivery user terminal 200. The authentication information is used to lock or unlock the luggage compartment 15 of the any one of the vehicles 10 to accommodate the package. The request begins at a request from the delivery user terminal 200. The center server 400 transmits authentication information of the intended one of the vehicles 10 to the delivery user terminal 200 via the delivery management server 500 based on the identification information of the client user. The vehicles 10 are associated with the identification information of the client user. The identification information of the client user is included in the delivery information. The delivery user locks or unlocks the luggage compartment 15 of the intended vehicle 10 with the use of the authentication information received by the delivery user terminal 200. Thus, the delivery user is allowed to access the luggage compartment 15 of the intended vehicle 10 in order to deliver the package. The authentication information is digital information that is transferred from the delivery user terminal 200 to the in-vehicle device 11 through short-range wireless communication and that causes the in-vehicle device 11 to lock or unlock the luggage compartment 15 of the intended vehicle 10 after undergoing an authentication process that is executed by the in-vehicle device 11.

Figure 2:
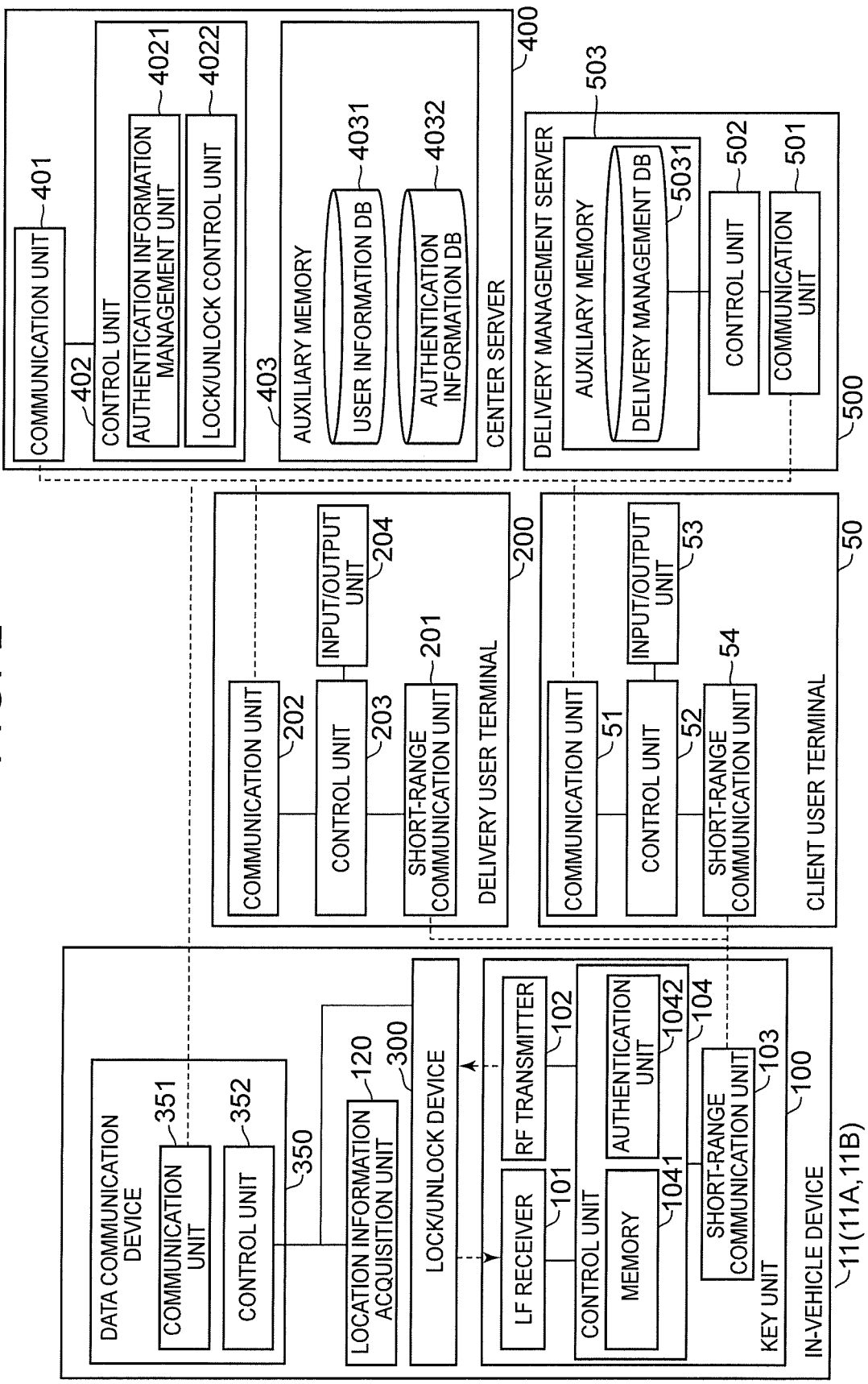
FIG. 2 is a block diagram that schematically shows an example of the configuration of the delivery management system including the authentication information providing server according to the embodiment.

FIG. 2 is a block diagram that schematically shows an example of the configuration of each of the in-vehicle device 11, delivery user terminal 200, client user terminal 50, delivery management server 500, and center server 400 that constitute the delivery management system 1 according to the present embodiment. The hardware configuration and functional configuration of the in-vehicle device 11, delivery user terminal 200, client user terminal 50, delivery management server 500, and center server 400 will be described with reference to FIG. 2.

The in-vehicle device 11 includes a key unit 100, a lock/unlock device (an example of a lock and unlock device) 300, a data communication device 350, and a location information acquisition unit 120. The key unit 100 includes a wireless interface similar to that of an electronic key of a smart key (hereinafter, mobile machine). By carrying out communication with the lock/unlock device 300 of the in-vehicle device 11, the key unit 100 is able to lock or unlock the luggage compartment 15 or passenger compartment of the vehicle 10 (which may also be referred to as that the key unit 100 is able to lock or unlock the vehicle 10 when the luggage compartment 15 and the passenger compartment do not need to be distinguished from each other) without using a physical key. The key unit 100 carries out short-range wireless communication with a mobile terminal, such as the delivery user terminal 200, and determines whether to behave as the electronic key of the vehicle 10 based on a result of the authentication process over the delivery user terminal 200.

When the delivery user terminal 200 accesses the luggage compartment 15 of the vehicle 10 in order to deliver the package, the delivery user terminal 200 gets the center server 400 to issue authentication information for locking or unlocking the luggage compartment 15 via the delivery management server 500 as described above. The authentication information transmitted from the delivery user terminal 200 to the key unit 100 is compared with authentication information prestored in the key unit 100. When the authentication process is successful, the delivery user terminal 200 is authenticated as a terminal that validly activates the in-vehicle device 11. When the delivery user terminal 200 has been authenticated, the key unit 100 transmits a key ID of the vehicle 10 associated with the authentication information to the lock/unlock device 300 together with a lock signal or an unlock signal. The key ID is prestored in the key unit 100. In the following description, the lock signal or the unlock signal is generally referred to as lock/unlock signal. The term lock/unlock signal represents at least any one of the lock signal and the unlock signal. The lock/unlock device 300 locks or unlocks the vehicle 10 when the key ID received from the key unit 100 coincides with a key ID prestored in the lock/unlock device 300.

The lock/unlock device 300 is a device for locking or unlocking the doors of the passenger compartment of the vehicle 10 or the luggage compartment door 16 of the vehicle 10. For example, the lock/unlock device 300 locks or unlocks the doors of the vehicle 10 in response to a lock signal or unlock signal that is transmitted from the mobile machine corresponding to the vehicle 10 via radio frequency (hereinafter, referred to as RF) waves. The lock/unlock device 300 also has the function of transmitting low-frequency (hereinafter, referred to as LF) waves for searching for the mobile machine.

In the present embodiment, instead of the above-described mobile machine, the key unit 100 controls locking and unlocking of the doors of the vehicle 10 by exchanging RF waves and LF waves with the lock/unlock device 300. Hereinafter, unless otherwise specified, description will be made on the assumption that a communication destination of the lock/unlock device 300 is limited to the key unit 100.

The key unit 100 is a device disposed at a predetermined location (for example, in a glove box) in the passenger compartment of the vehicle 10. The key unit 100 has the function of authenticating the delivery user terminal 200, or the like, by carrying out short-range wireless communication with the delivery user terminal 200, or the like, and the function of transmitting a lock/unlock signal with the use of RF waves based on a result of the authentication. The key unit 100 includes an LF receiver 101, an RF transmitter 102, a short-range communication unit 103, and a control unit 104.

The LF receiver 101 is a device that receives a polling signal that is transmitted from the lock/unlock device 300 via LF waves. The RF transmitter 102 is a device that transmits a lock/unlock signal to the lock/unlock device 300 via RF waves.

The short-range communication unit 103 is a device that carries out communication with the delivery user terminal 200. The short-range communication unit 103 carries out communication within a short range (to such an extent that communication is available between the inside of the passenger compartment and the outside of the passenger compartment) with the use of predetermined wireless communication standards. In the present embodiment, the short-range communication unit 103 carries out data communication based on Bluetooth (registered trademark) low energy (hereinafter, BLE). BLE is low-power communication standards with Bluetooth. BLE has such a characteristic that pairing is not required between devices and it is possible to immediately start communication when an intended device is detected. In the present embodiment, BLE is illustrated; however, other wireless communication standards are also usable. For example, Near field communication (NFC), Ultra wideband (UWB), Wi-Fi (registered trademark), and the like, are usable.

The control unit 104 is a computer that executes control for authenticating the delivery user terminal 200 by carrying out short-range wireless communication with the delivery user terminal 200 via the short-range communication unit 103, and that also executes control for transmitting a lock/unlock signal based on a result of the authentication.

The control unit 104 includes a memory 1041 and an authentication unit 1042. A control program for controlling the key unit 100 is stored in the memory 1041. The control unit 104 may implement various functions including the authentication unit 1042 by executing control programs stored in the memory 1041 on a CPU (not shown). For example, the control unit 104 implements the function of receiving via the LF receiver 101 a polling signal transmitted from the lock/unlock device 300 as LF waves, the function of transmitting a lock/unlock signal to the lock/unlock device 300 via the RF transmitter 102 as RF waves, the function of processing communication with the delivery user terminal 200, which is carried out via the short-range communication unit 103, the function of generating a lock/unlock signal in the case where authentication of the delivery user terminal 200 by the authentication unit 1042 is successful, and the like.

The authentication unit 1042 authenticates the delivery user terminal 200 based on the authentication information included in a lock request or unlock request (hereinafter, generally referred to as lock/unlock request) transmitted from the delivery user terminal 200. Specifically, the authentication unit 1042 compares the authentication information stored in the memory 1041 with the authentication information transmitted from the delivery user terminal 200. When these pieces of authentication information have a predetermined relation, the authentication unit 1042 determines that authentication is successful. When both pieces of authentication information do not have the predetermined relation, the authentication unit 1042 determines that authentication has failed. The predetermined relation includes not only the case where the authentication information stored in the memory 1041 and the authentication information transmitted from the delivery user terminal 200 match each other but also the case where results of a process, such as predetermined encryption and decryption, using the two pieces of authentication information match each other, the case where a result obtained by decrypting one of the two pieces of authentication information matches the other one of the two pieces of authentication information, and the like.

When the authentication unit 1042 succeeds in authentication of the delivery user terminal 200, a lock/unlock signal generated in response to a request received from the delivery user terminal 200 is transmitted to the lock/unlock device 300 via the RF transmitter 102. Hereinafter, as the need for description arises, the authentication information that is stored in the key unit 100 may be referred to as device authentication information, and the authentication information that is transmitted from the delivery user terminal 200, or the like, may be referred to as terminal authentication information. The key unit 100 transmits the key ID to the lock/unlock device 300 together with a lock/unlock signal.

In this way, the in-vehicle device 11 executes a series of processes. That is, the in-vehicle device 11 activates the lock/unlock device 300 through the authentication process that is executed by the key unit 100 as the authentication information is transmitted from the delivery user terminal 200, and locks or unlocks the passenger compartment or luggage compartment 15 of the vehicle 10.

The in-vehicle device 11 includes the data communication device 350. The data communication device 350 is a communication device that is connected to the center server 400 via the network N1 and that is able to exchange data with the center server 400. The data communication device 350 includes a communication unit 351 and a control unit 352. The communication unit 351 is a communication module for connecting the in-vehicle device 11 to the network N1. In the present embodiment, the communication unit 351 is able to carry out communication with another device (for example, the center server 400, or the like) via the network N1 by using a mobile communication service, such as 3rd generation (3G) and long term evolution (LTE).

The control unit 352 is a computer that governs control over the data communication device 350. The control unit 352 executes, for example, a process of transmitting the location information of the vehicle 10 to the center server 400. The control unit 352 is formed of, for example, a microcomputer. The control unit 352 implements functions for executing the above-described various processes by executing programs stored in a storage device (such as a ROM) (not shown) on a CPU (not shown).

The in-vehicle device 11 includes the location information acquisition unit 120. The location information acquisition unit 120 acquires the location information of the vehicle 10. The location information acquisition unit 120 acquires the current location of the vehicle 10 with the use of global positioning system (GPS), or the like. The location information acquired by the location information acquisition unit 120 is transmitted to the center server 400 via the data communication device 350 together with the key ID. Therefore, the center server 400 is able to acquire the location of each of the vehicles 10.

Next, the delivery user terminal 200 will be described. The delivery user terminal 200 is a small computer. Examples of the small computer include a smart phone, a cellular phone, a tablet terminal, a personal information terminal, and a wearable computer (such as a smart watch). The delivery user terminal 200 may be a personal computer (PC) that is connected to the delivery management server 500 via the network N1, such as the Internet that is a public telecommunication network. The delivery user terminal 200 includes a short-range communication unit 201, a communication unit 202, a control unit 203, and an input/output unit 204.

The short-range communication unit 201 is a module that carries out communication with the key unit 100 with the use of the same communication standards as the short-range communication unit 103 of the key unit 100. A network that is established between the short-range communication unit 201 and the key unit 100 is denoted by N2 in FIG. 1. The communication unit 202 is a communication module for connecting the delivery user terminal 200 to the network N1. In the present embodiment, the communication unit 202 is able to carry out communication with another device (such as the delivery management server 500) via the network N1 by using a mobile communication service, such as 3rd generation (3G) and long term evolution (LTE).

The control unit 203 is a computer that governs control over the delivery user terminal 200. The control unit 203 executes, for example, a process of acquiring the above-described terminal authentication information, a process of generating a lock/unlock request including the acquired terminal authentication information, a process of transmitting the generated lock/unlock request to the key unit 100, and the like. The control unit 203 is formed of, for example, a microcomputer. The control unit 203 implements functions for executing the above-described various processes by executing programs stored in a storage device (such as a ROM) (not shown) on a CPU (not shown).

The control unit 203 makes an interaction with the delivery user via the input/output unit 204. The input/output unit 204 is a module that accepts an input operation made by the delivery user and provides information to the delivery user. Specifically, the input/output unit 204 is formed of a touch panel, a control unit of the touch panel, a liquid crystal display, and a control unit of the liquid crystal display. In the present embodiment, the touch panel and the liquid crystal display are integrated into a single touch panel display.

The control unit 203 displays an operation page on the input/output unit 204, and generates a lock/unlock request based on an operation made by the delivery user. For example, the control unit 203 outputs an icon for unlocking the doors, an icon for locking the doors, and the like, on the touch panel display, and generates an unlock request or a lock request based on an operation made by the delivery user. The operation that is made by the delivery user is not limited to an operation via the touch panel display. For example, the operation may be, for example, an operation made via a hardware switch, or the like.

The control unit 203 executes a process of acquiring terminal authentication information from the center server 400. The terminal authentication information is not information (key ID) for the lock/unlock device 300 to authenticate the key unit 100. The terminal authentication information is information for the key unit 100 to authenticate the delivery user terminal 200 (for example, authentication information corresponding to the authentication information unique to the key unit 100 mounted on the vehicle 10). Specifically, the control unit 203 transmits a request to issue terminal authentication information to the center server 400 via the delivery management server 500. The request to issue terminal authentication information includes the identification information of the delivery user terminal 200 and a signal that requests issuance of terminal authentication information unique to the key unit 100. As the center server 400 receives a request to issue terminal authentication information, the center server 400 acquires terminal authentication information unique to the key unit 100 mounted on the vehicle 10, and transmits the acquired terminal authentication information to the delivery user terminal 200 via the delivery management server 500. Thus, an operation to unlock the vehicle 10 with the use of the delivery user terminal 200 is enabled. When the delivery user terminal 200 has no terminal authentication information, a lock operation and an unlock operation through the operation page are disabled.

In the present embodiment, terminal authentication information that the delivery user terminal 200 acquires is a one-time key. The one-time key is invalidated as the luggage compartment door 16 is locked subsequent to completion of delivery user's delivery. For example, at the timing at which terminal authentication information that is transmitted from the center server 400 has been received by the delivery user terminal 200, the terminal authentication information is stored in a memory (not shown) of the delivery user terminal 200. After that, at the timing at which a lock notification that is transmitted from the key unit 100 when the luggage compartment door 16 is locked subsequent to completion of delivery has been received by the delivery user terminal 200, the terminal authentication information is erased from the memory.

The timing at which the terminal authentication information stored in the memory of the delivery user terminal 200 is erased is not limited to the above-described example. The timing may be the timing after a lapse of a predetermined time from a point in time at which the delivery user terminal 200 has received terminal authentication information that is transmitted from the center server 400 (or a point in time at which the center server 400 has transmitted terminal authentication information toward the delivery user terminal 200). Old terminal authentication information stored in the delivery user terminal 200 may be erased at a point in time at which the delivery user terminal 200 has received new terminal authentication information from the center server 400. The terminal authentication information is not limited to the above-described one-time key. The terminal authentication information may be a time-limited key that is enabled only in a predetermined time period. Irrespective of whether the terminal authentication information is a one-time key or a time-limited key, device authentication information corresponding to the terminal authentication information is stored in the key unit 100 in advance.

Next, the client user terminal 50 will be described. The client user terminal 50, as well as the delivery user terminal 200, may also be a small computer. Examples of the small computer include a smart phone, a cellular phone, a tablet terminal, a personal information terminal, and a wearable computer (such as a smart watch). The client user terminal 50 may be a personal computer. The client user terminal 50 includes a communication unit 51, a control unit 52, an input/output unit 53, and a short-range communication unit 54.

The communication unit 51 is a communication module for a connection to the network N1. The communication unit 51 is functionally equivalent to the communication unit 202. The control unit 52 is a computer that governs control over the client user terminal 50. The control unit 52 is formed of, for example, a microcomputer. The control unit 52 implements functions for executing various processes by executing programs stored in a storage device (such as a ROM) (not shown) on a CPU (not shown). The input/output unit 53 is also a module that accepts an input operation made by the client user and provides information to the client user. The input/output unit 53 is functionally similar to the input/output unit 204.

The short-range communication unit 54 is a module that carries out communication with the key unit 100 by using the same communication standards as the short-range communication unit 103. The control unit 52 executes a process of acquiring terminal authentication information from the center server 400. The control unit 52 activates the lock/unlock device 300 from the client user terminal 50 by transmitting the terminal authentication information to the key unit 100 via the short-range communication unit 54 through short-range wireless communication.

Next, the delivery management server 500 will be described. The delivery management server 500 has a general computer configuration. When a plurality of delivery service providers participate in the delivery management system 1, each of the delivery service providers prepares at least one delivery management server as its own management server. The delivery management server 500 is a computer that includes a processor (not shown), a main memory (not shown), and an auxiliary memory 503. Examples of the processor include a central processing unit (CPU) and a digital signal processor (DSP). Examples of the main memory include a random access memory (RAM) and a read only memory (ROM). Examples of the auxiliary memory 503 include an erasable programmable ROM (EPROM), a hard disk drive (HDD), and removable media. Examples of the removable media include a universal serial bus (USB) memory and a disk recording medium, such as a compact disc (CD) and a digital versatile disc (DVD). The auxiliary memory 503 stores an operating system (OS), various programs, various tables, and the like. The programs stored in the auxiliary memory 503 are loaded onto a working area of the main memory, the loaded programs are executed, and components, and the like, are controlled through execution of the programs. Thus, functions that agree to a predetermined purpose are implemented.

The delivery management server 500 further includes a communication unit 501. The communication unit 501 establishes a connection with other devices. The communication unit 501 carries out communication between the delivery management server 500 and the other devices (for example, the center server 400, the delivery user terminal 200, the client user terminal 50, and the like). The communication unit 501 is, for example, a local area network (LAN) interface board, or a wireless communication circuit for wireless communication. The LAN interface board or the wireless communication circuit is connected to the network N1, such as the Internet that is a public telecommunication network.

The delivery management server 500 includes a delivery management database (DB) 5031. The delivery management DB 5031 stores the above-described delivery information. The delivery management DB 5031 is constructed such that delivery information is stored in the auxiliary memory 503. In the delivery management DB 5031, a client user and delivery information are associated with each other. The delivery management DB 5031 is constructed such that the program of a database management system (DBMS), which is executed by the processor, manages data stored in the auxiliary memory 503. The delivery management DB 5031 is, for example, a relational database.

The configuration of delivery information that is stored in the delivery management DB 5031 will be described with reference to FIG. 3. FIG. 3 illustrates the configuration of a delivery information table. The delivery information table contains a client user ID field, a delivery date field, a place of delivery field, a delivery status field, and a package attribute field. Identification information for identifying a client user is input to the client user ID field. Information that indicates a date on which a package is delivered is input to the delivery date field. Information that indicates whether delivery of a package by a delivery user has completed is input to the delivery status field. For example, information for identifying a package, such as weight and size, associated with the package, is input to the package attribute field.

In the delivery management server 500, a control unit 502 that executes management control, such as registration of delivery information in the delivery management DB 5031 and update of delivery information in the delivery management DB 5031 is realized when the above-described processor executes a program. For example, when the client user submits a request to deliver a package via the client user terminal 50, the control unit 502 generates delivery information corresponding to the client user by associating a delivery date, a place of delivery, and the like, with the identification information of the client user, and stores the delivery information in the delivery management DB 5031. After the control unit 502 generates the delivery information, when a notification of a change of information about the delivery date or place of delivery has been provided from the client user, the control unit 502 updates the stored delivery information in accordance with the change. The control unit 502 carries out communication with the delivery user terminal 200 via the communication unit 501, and updates information about the status of the package, included in the delivery information. For example, the control unit 502 receives status information (for example, information that indicates completion of delivery) input via the input/output unit 204 by the delivery user from the delivery user terminal 200, and updates the corresponding delivery information.

The delivery management DB 5031 also stores vehicle management information that associates a client user with vehicles 10 as a place of delivery. The configuration of the vehicle management information will be described with reference to FIG. 4. FIG. 4 illustrates the configuration of a vehicle management information table. The vehicle management information table contains a client user ID field, a vehicle type field, a color field, a license number field, a vehicle location field, and a priority field. Pieces of information for identifying a vehicle 10 (vehicle type, the color of the vehicle, and the license number of the vehicle) are respectively input to the vehicle type field, the color field, and the license number field so that a delivery user is able to find the vehicle 10 when a client user selects the vehicle 10 as a place of delivery. Location information about a location at which the vehicle 10 is located is input to the vehicle location field. The location information of the vehicle 10 may be transmitted from the center server 400 to the delivery management server 500 or may be input by the client user via the client user terminal 50. A plurality of the vehicles 10 may be registered in the vehicle management information table in association with the same client user ID. The vehicle management information table contains the priority field to which the priority of a place of delivery is input when a plurality of vehicles 10 is registered in association with one client user ID. Input of the priority is not always required. In the present embodiment, the auxiliary memory 503 having the delivery management DB 5031 may be regarded as a memory or second memory of the disclosure.

The control unit 502 transmits an instruction about delivery to the delivery user terminal 200 so that the delivery user is able to deliver a package to the intended vehicle 10 based on the delivery information and vehicle management information associated with the client user. This instruction about delivery may be transmitted to the delivery user terminal 200 multiple times, not once. For example, the control unit 502 may transmit all delivery instructions related to delivery on the next day to the delivery user terminal 200 on the day before a scheduled delivery date, and may transmit the delivery instructions again on the day of delivery. When the delivery information or the vehicle management information has been updated before the control unit 502 transmits the delivery instructions again, the control unit 502 incorporates the update into the delivery instructions.

Any functional component of the delivery management server 500 or part of the processes of the functional components may be executed by another computer that is connected to the network N1. A series of processes that are executed by the delivery management server 500 may be executed by hardware or may be executed by software.

Next, the center server 400 will be described. The center server 400 also has a general computer configuration. The basic hardware configuration of the center server 400 is the same as that of the delivery management server 500. The center server 400 includes a processor (not shown), a main memory (not shown), and an auxiliary memory 403. Programs stored in the auxiliary memory 403 are loaded onto a working area of the main memory, the loaded programs are executed, and components, and the like, are controlled through execution of the programs. Thus, functions that agree to a predetermined purpose are implemented. The center server 400 also includes a communication unit 401. The communication unit 401 is functionally equivalent to the communication unit 501 of the delivery management server 500. The communication unit 401 carries out communication between the center server 400 and other devices (for example, the delivery management server 500, the client user terminal 50, and the like).

The auxiliary memory 403 of the center server 400 includes a user information DB 4031 and an authentication information DB 4032. The user information DB 4031 and the authentication information DB 4032 store various pieces of information. These databases (DBs) are constructed such that the program of a database management system, which is executed by the processor, manages data stored in the auxiliary memory 403. The user information DB 4031 and the authentication information DB 4032 are, for example, relational databases.

The user information DB 4031 stores identification information of users (for example, the delivery user and the client user) who use the vehicles 10, corresponding passwords, and the like. The authentication information DB 4032 stores pieces of authentication information of the vehicles 10. The pieces of authentication information correspond to the above-described terminal authentication information. The authentication information of each vehicle 10 is information associated with the identification information (key ID) of the vehicle 10, and may be, for example, identification information unique to the key unit 100 of the in-vehicle device 11. In the present embodiment, the auxiliary memory 403 having the authentication information DB 4032 may be regarded as a memory or first memory of the disclosure. The authentication information DB 4032 may store not only the authentication information of each vehicle 10 but also information, such as an effective period (including effective time period) of the authentication information, and whether authentication information is invalid. The effective period of authentication information may be transmitted to the delivery user terminal 200 together with the authentication information. When the delivery user terminal 200 receives the effective period of authentication information, the delivery user terminal 200 is able to invalidate the authentication information of which the effective period has expired by deleting the authentication information. Whether authentication information is invalid indicates the status of whether the authentication information is effective when transmitted to the delivery user terminal 200, and whether the effective period of the authentication information has expired and is invalid. When authentication information is effective when transmitted to the delivery user terminal 200, an authentication information management unit 4021 (described later) prevents the authentication information from being issued with an overlap effective period. Thus, it is possible to avoid overlap issuance of the authentication information.

In the center server 400, a control unit 402 that executes control related to issuance of authentication information to the delivery user terminal 200, or the like is realized when the above-described processor executes a program. More specifically, the control unit 402 includes the authentication information management unit 4021 and a lock/unlock control unit 4022 as functional units.

The authentication information management unit 4021 manages issuance of authentication information for locking or unlocking the intended vehicle 10. More specifically, the authentication information management unit 4021 accepts a request to issue authentication information for locking or unlocking the intended vehicle 10 from the delivery user terminal 200 via the delivery management server 500. The authentication information management unit 4021 receives information about the delivery user terminal 200 together with a request to issue the authentication information. The delivery user terminal 200 is a destination of authentication information. The authentication information management unit 4021 transmits the authentication information (terminal authentication information) corresponding to the key unit 100 to the delivery user terminal 200 via the delivery management server 500. The authentication information management unit 4021 may generate authentication information including information about an effective period. When an effective period has expired even when the key unit 100 of the in-vehicle device 11 receives authentication information including information about the effective period, the key unit 100 determines that the authentication information is invalid, and does not lock or unlock the vehicle 10. In the present embodiment, the authentication information management unit 4021 may be regarded as a control unit or first control unit of the disclosure.

Even when authentication information corresponding to the first vehicle 10A has been issued from the center server 400 in response to an issuance request from the delivery user terminal 200 as described above, but when it is not possible to deliver a package to the first vehicle 10A, the delivery user terminal 200 is allowed to make a request of the center server 400 via the delivery management server 500 to issue authentication information corresponding to an alternative vehicle. In this case, the delivery user performs a predetermined operation for requesting an alternative vehicle to the input/output unit 204 of the delivery user terminal 200 (for example, causes the touch panel display to display an icon for making a request to issue authentication information corresponding to an alternative vehicle, and taps the icon). In accordance with this predetermined operation, the control unit 203 of the delivery user terminal 200 generates a request to issue authentication information corresponding to an alternative vehicle. The operation that is performed by the delivery user is not limited to an operation via the touch panel display. The operation may be performed via, for example, a hardware switch, or the like.

When there is a request to issue authentication information corresponding to an alternative vehicle from the delivery user terminal 200, the control unit 502 of the delivery management server 500 consults the vehicle management information shown in FIG. 4, and searches for a vehicle other than the first vehicle 10A and associated with the same client user ID. When there is a vehicle other than the first vehicle 10A (second vehicle 10B), the control unit 502 selects the second vehicle 10B as an alternative vehicle. At this time, the control unit 502 selects the vehicle of which the priority input to the priority field shown in FIG. 4 is higher, as the second vehicle 10B. As the second vehicle 10B is selected in this way, the delivery management server 500 makes a request of the center server 400 to issue authentication information corresponding to the second vehicle 10B. As the authentication information corresponding to the second vehicle 10B has been issued from the center server 400, the delivery management server 500 transmits the vehicle information (vehicle type, the color of the vehicle, the license number of the vehicle, and the location of the vehicle) of the second vehicle 10B to the delivery user terminal 200 together with the authentication information. In this way, with the delivery user terminal 200, it is possible to access the luggage compartment 15B of the second vehicle 10B, and it is possible to deliver a package to the luggage compartment 15B. When it is not possible to deliver a package to the second vehicle 10B, the delivery user terminal 200 is allowed to further make a request to issue authentication information corresponding to further another one of the vehicles 10. When there is no vehicle 10 other than the first vehicle 10A and associated with the same client user ID, the control unit 502 of the delivery management server 500 informs the delivery user terminal 200 that there is no vehicle 10 other than the first vehicle 10A and associated with the same client user ID.

Figure 5:
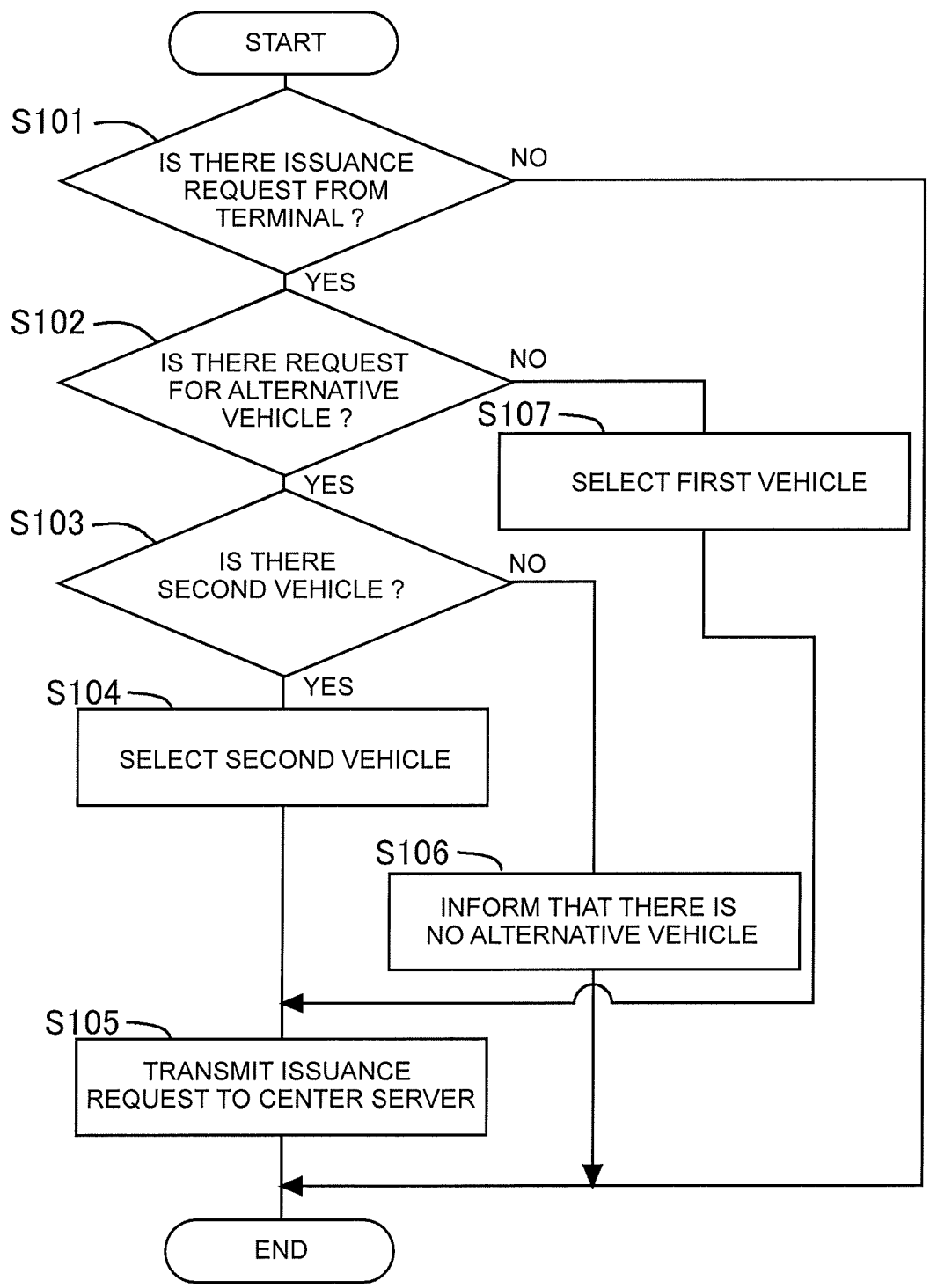
FIG. 5 is a flowchart that shows the flow of authentication information request control.

Next, FIG. 5 is a flowchart that shows the flow of control at the time when the delivery management server 500 makes a request of the center server 400 to issue authentication information (authentication information request control). The flowchart shown in FIG. 5 is repeatedly executed at predetermined time intervals by the control unit 502 of the delivery management server 500. In the present embodiment, the control unit 502 of the delivery management server 500, which executes authentication information request control, may be regarded as a control unit or second control unit of the disclosure. Initially, in S101, it is determined whether there is a request to issue authentication information from the delivery user terminal 200. This issuance request includes a first issuance request for a package to be delivered (a request to issue authentication information corresponding to the first vehicle 10A) and a request to issue authentication information corresponding to the alternative vehicle (second vehicle 10B). When affirmative determination is made in S101, the process proceeds to S102. When negative determination is made in S101, the authentication information request control is ended. When there is a request to issue authentication information, the control unit 502 of the delivery management server 500 identifies the delivery user terminal 200 that is an issuance request source and the client user ID corresponding to the package to be delivered based on information included in the issuance request.

In S102, it is determined whether a signal from the delivery user terminal 200 includes a request to issue authentication information corresponding to an alternative vehicle. When affirmative determination is made in S102, the process proceeds to S103. When negative determination is made in S102, the process proceeds to S107. In S107, the first vehicle 10A is selected. The first vehicle 10A may be the vehicle 10 that the client user terminal 50 has specified as a place of delivery of the package in the delivery management server 500 at the time when the client user submits a request to deliver the package, or may be the vehicle 10 that the delivery management server 500 has selected from among the vehicles 10 associated with the client user ID and registered in the vehicle management information table shown in FIG. 4. For example, all the vehicles 10 associated with the client user ID specified in S101 and registered in the vehicle management information table shown in FIG. 4 may be extracted based on the client user ID, the vehicle 10 of which the priority input to the priority field is the highest may be selected as the first vehicle 10A from among the vehicles 10. When there is only one vehicle 10 associated with the client user ID, it is assumed that the priority of the vehicle 10 is the highest.

In S103, it is determined whether there is an alternative vehicle (second vehicle 10B). That is, in the vehicle management information table shown in FIG. 4, it is determined whether any vehicle 10 different from the first vehicle 10A to which the delivery user was supposed to deliver the package is associated with the same client user ID. When affirmative determination is made in S103, the process proceeds to S104. When negative determination is made in S103, the process proceeds to S106. In S106, it is difficult to deliver the package because there is no second vehicle 10B. In this case, the control unit 502 of the delivery management server 500 transmits a signal indicating that there is no alternative vehicle to the delivery user terminal 200. The control unit 203 of the delivery user terminal 200 that has received the signal displays on the touch panel display that there is no alternative vehicle. On the other hand, in S104, the second vehicle 10B is selected. At this time, the control unit 502 of the delivery management server 500 extracts all the vehicles 10 associated with the client user ID and registered in the vehicle management information table shown in FIG. 4 based on the client user ID identified in S101, and selects the vehicle 10 of which the priority input to the priority field is the highest as the second vehicle 10B from among the vehicles 10 other than the first vehicle 10A. In S105, the control unit 502 transmits, to the center server 400, a signal making a request to issue authentication information corresponding to the second vehicle 10B selected in S104 or the first vehicle 10A selected in S107. Thus, the authentication information request control ends. After that, as the delivery management server 500 receives authentication information issued from the center server 400, the delivery management server 500 transmits the vehicle information of the selected vehicle 10 together with the authentication information to the delivery user terminal 200.

Figure 6:
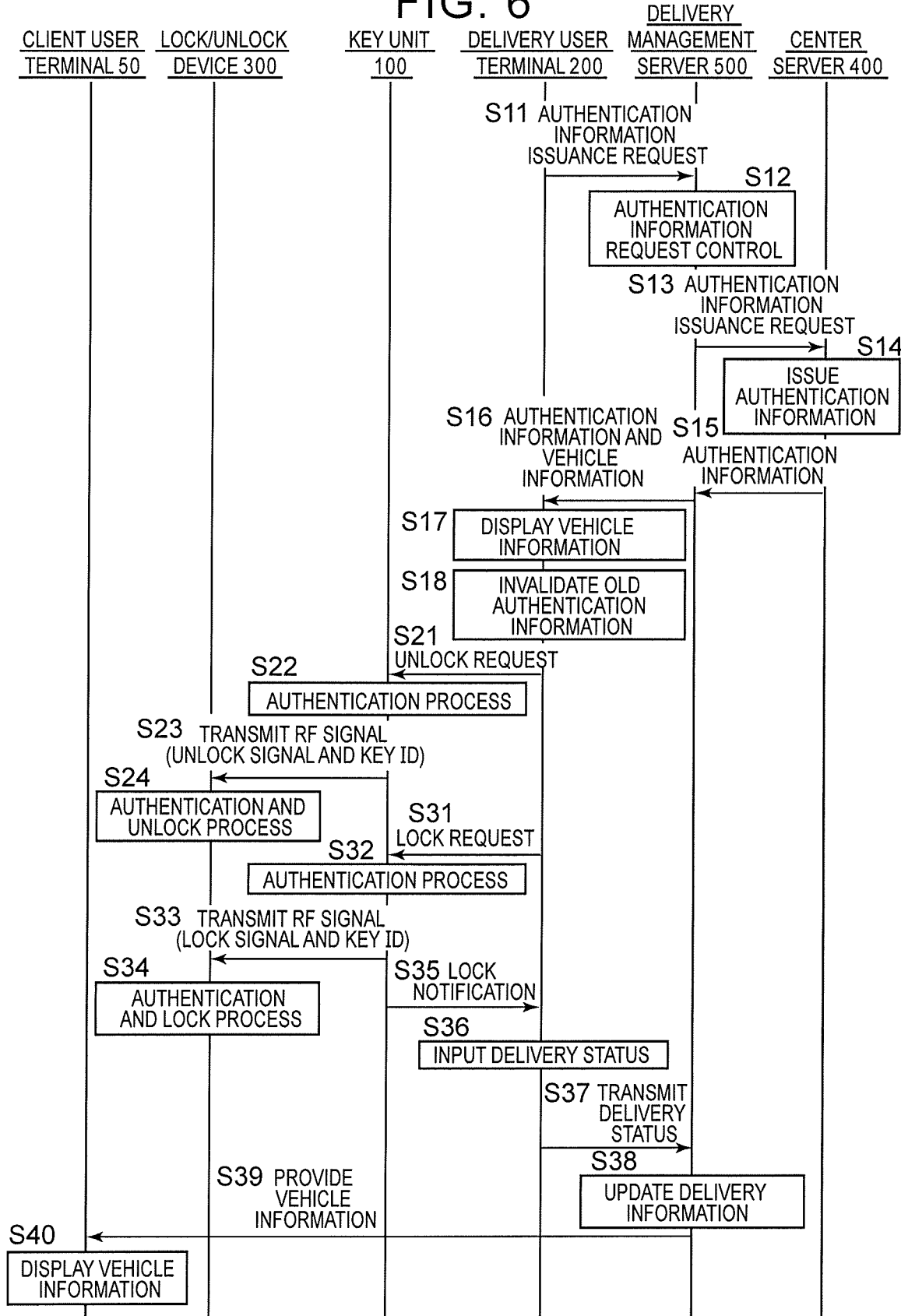
FIG. 6 is a view that shows the flow of operations of the delivery management system at the time when authentication information is issued to a delivery user terminal.

Next, the operation of the delivery management system 1 at the time when authentication information has been issued to the delivery user terminal 200 will be described with reference to FIG. 6. In the flow shown in FIG. 6, in order to deliver a package in accordance with a request for delivery from the client user, the delivery user terminal 200 makes a request of the delivery management server 500 to issue authentication information before the delivery user reaches the vehicle 10 (the process of S11). This request includes the attribute information of the package, the client user ID, and the like. This issuance request includes a first issuance request for the package to be delivered (a request to issue authentication information corresponding to the first vehicle 10A) and a request to issue authentication information corresponding to the alternative vehicle (second vehicle 10B). As the delivery management server 500 receives a request to issue authentication information from the delivery user terminal 200, the delivery management server 500 executes the authentication information request control shown in FIG. 5 (the process of S12). As any one of the vehicles 10 is selected through the authentication information request control, the delivery management server 500 makes a request of the center server 400 to issue authentication information (S13). The center server 400 issues authentication information of the intended vehicle 10 (the process of S14).

In S15, the center server 400 transmits the authentication information to the delivery management server 500. In S16, the delivery management server 500 transmits the authentication information and the vehicle information to the delivery user terminal 200. The vehicle information is information for allowing the delivery user to find the second vehicle 10B as in the case of the vehicle management information shown in FIG. 4. As the delivery user terminal 200 receives the vehicle information, the vehicle information is displayed on the touch panel display of the delivery user terminal 200 (the process of S17). In accordance with this information, the delivery user moves to the place in which the intended vehicle 10 is located. As the authentication information transmitted from the center server 400 has been received by the delivery user terminal 200, it is possible to lock or unlock the luggage compartment 15 of the vehicle 10 with the use of the delivery user terminal 200.

When the delivery user terminal 200 has requested to issue authentication information corresponding to an alternative vehicle, the authentication information received before and stored in the delivery user terminal 200 (for example, the authentication information corresponding to the first vehicle 10A) may be invalidated at the time when the delivery user terminal 200 has received the authentication information corresponding to the alternative vehicle (the process of S18). That is, the authentication information corresponding to the first vehicle 10A and stored in the memory of the delivery user terminal 200 may be erased from the delivery user terminal 200 at the timing at which the delivery user terminal 200 has received the authentication information corresponding to the second vehicle 10B. Invalidation of the authentication information corresponding to the first vehicle 10A may be performed by the delivery user terminal 200 in accordance with an instruction from the center server 400 or the delivery management server 500.

Subsequently, in S21 to S24, a process for unlocking the luggage compartment 15 of the vehicle 10 with the use of the delivery user terminal 200 is executed. When the processes of S21 to S24 are executed, it is assumed that the delivery user terminal 200 is moved by the delivery user to a location at which short-range wireless communication between the key unit 100 of the vehicle 10 and the delivery user terminal 200 is able to be established.

As the delivery user performs an operation to unlock the vehicle 10 via the input/output unit 204 of the delivery user terminal 200, the delivery user terminal 200 transmits an unlock request including the authentication information to the key unit 100 in S21. As the key unit 100 receives the unlock request transmitted from the delivery user terminal 200, the key unit 100 executes an authentication process in S22 by comparing the authentication information (terminal authentication information) included in the unlock request with the authentication information (device authentication information) stored in the memory 1041. When authentication of both pieces of authentication information is successful, the key unit 100 transmits an unlock signal and the key ID to the lock/unlock device 300 in S23. As the lock/unlock device 300 receives the unlock signal and key ID transmitted from the key unit 100, the lock/unlock device 300 executes an authentication process based on the received key ID in S24. When authentication is successful, the luggage compartment 15 of the vehicle 10 is unlocked. At this time, the lock/unlock device 300 may, for example, answer back to the key unit 100.

In S31 to S40, a process for locking the vehicle 10 with the use of the delivery user terminal 200 and a process related to the locking are executed. As the delivery user opens the luggage compartment door 16 through the unlocking process, closes the luggage compartment door 16 after predetermined delivery, and performs an operation to lock the vehicle 10 via the input/output unit 204 of the delivery user terminal 200, the delivery user terminal 200 transmits a lock request including the authentication information to the key unit 100 in S31. As the key unit 100 receives the lock request transmitted from the delivery user terminal 200, the key unit 100 executes an authentication process in S32 by comparing the authentication information (terminal authentication information) included in the lock request transmitted from the delivery user terminal 200 with the authentication information (device authentication information) stored in the memory 1041. When authentication of both pieces of authentication information is successful, the key unit 100 transmits a lock signal and the key ID to the lock/unlock device 300 in S33. As the lock/unlock device 300 receives the lock signal and key ID transmitted from the key unit 100, the lock/unlock device 300 executes an authentication process based on the received key ID in S34. When authentication is successful, the luggage compartment 15 of the vehicle 10 is locked. After the key unit 100 transmits the lock signal to the lock/unlock device 300, the key unit 100 transmits a notification of completion of locking (lock notification) to the delivery user terminal 200 (the process of S35). Thus, the notification of completion of locking is output on the touch panel display of the delivery user terminal 200.

As the delivery user recognizes completion of locking through the lock notification, the delivery user inputs the latest delivery status, that is, the status that delivery has completed, via the input/output unit 204 of the delivery user terminal 200 in order to update the delivery status in the delivery information stored in the delivery management server 500 (the process of S36). Thus, the latest delivery status is transmitted from the delivery user terminal 200 to the delivery management server 500 (the process of S37). In the delivery management server 500 that has received the latest delivery status, the control unit 502 updates the delivery information (the process of S38). For update of the delivery status, instead of inputting information for the update by the delivery user, as the delivery user terminal 200 receives a lock notification from the key unit 100, the delivery user terminal 200 may subsequently output an update instruction to the delivery management server 500 such that the delivery status becomes completion of delivery. When the authentication information used by the delivery user terminal 200 for this delivery is a one-time key, the authentication information acquired in S16 may be invalidated at the timing at which the delivery user terminal 200 has received a lock notification in the process of S35. That is, the authentication information stored in the memory of the delivery user terminal 200 may be erased from the delivery user terminal 200 at the timing at which the delivery user terminal 200 has received a lock notification.

As the delivery information is updated in S38, the delivery management server 500 transmits, to the client user terminal 50, a signal that indicates information about the vehicle 10 to which the package has been delivered (the process of S39). This indication is performed by the control unit 502 of the delivery management server 500. In the present embodiment, the control unit 502 that transmits the signal may be regarded as the control unit of the disclosure. As the control unit 52 of the client user terminal 50 receives the vehicle information, the control unit 52 displays the vehicle information on the touch panel display (input/output unit 53) (the process of S40). Based on the vehicle information, the client user is allowed to identify the vehicle 10 to which the package has been delivered. The processes of S39 and S40 may be executed only when the package has been delivered to the second vehicle 10B.

As described above, according to the present embodiment, even when it becomes difficult to deliver a package to an initially scheduled vehicle 10 because the vehicle 10 has moved before the package is delivered to the vehicle 10, it is possible to select an alternative vehicle, so it is possible to increase an opportunity to deliver a package.

In the above description, part of the functions of the center server 400 may be implemented in the delivery management server 500, and part or all of the functions of the delivery management server 500 may be implemented in the center server 400. The center server 400 and the delivery management server 500 may be integrated with each other. Therefore, the delivery management server 500 may be regarded as the memory or first memory of the disclosure or the control unit or first control unit of the disclosure. The center server 400 may be regarded as the memory or second memory of the disclosure or the control unit or second control unit of the disclosure. In the present embodiment, the delivery management server 500 or the center server 400 may be regarded as an authentication server of the disclosure.

The priority of each vehicle 10, shown in FIG. 4, may be input by the client user or may be input by the delivery service provider. The priority of each vehicle 10 may be fixed or may be varied depending on a situation. For example, the priority of each vehicle 10 may be increased as the vehicle 10 is located closer to the current location of a delivery user. On the other hand, any one vehicle may be selected from among the vehicles 10 associated with the client user ID without the necessity to input a priority to the priority field shown in FIG. 4.

In the present embodiment, the one second vehicle 10B is described as the alternative vehicle by way of example. Alternatively, a plurality of vehicles may be used as candidates for the alternative vehicle. The alternative vehicle may be selected from among the plurality of candidates in accordance with the priority or at will.

Second Embodiment

Figure 7:
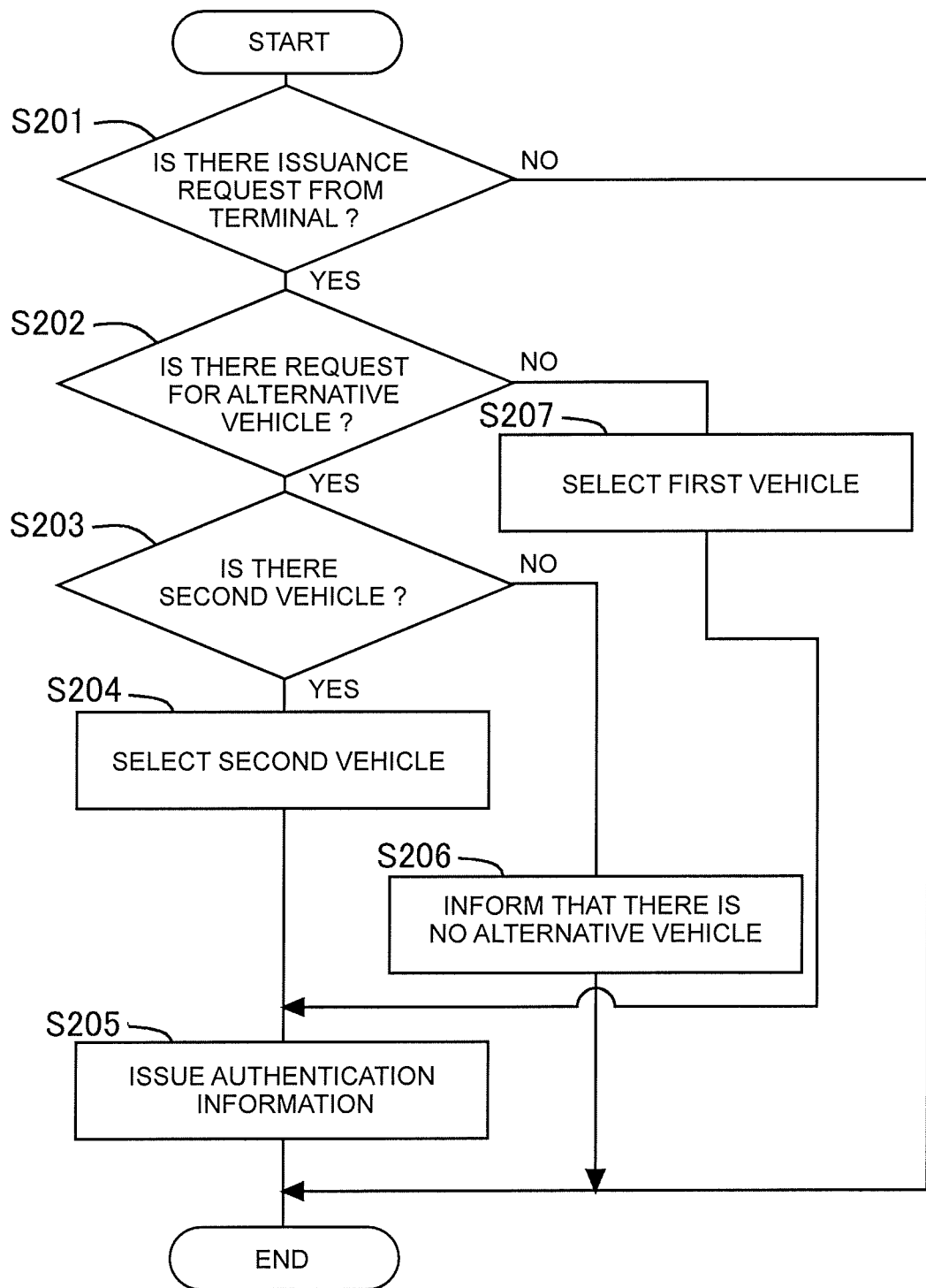
FIG. 7 is a flowchart that shows the flow of authentication information issuance control.

An embodiment in which the control unit 402 of the center server 400 executes the following authentication information issuance control in place of the control unit 502 of the delivery management server 500 executing the authentication information request control shown in FIG. 5 will be described. In this case, the auxiliary memory 403 of the center server 400 has a function corresponding to the auxiliary memory 503 having the delivery management DB 5031. Therefore, the vehicle management information table shown in FIG. 4 is generated in the center server 400. FIG. 7 is a flowchart that shows the flow of the authentication information issuance control. The flowchart shown in FIG. 7 is repeatedly executed by the control unit 402 of the center server 400 at predetermined time intervals. The control unit 402 of the center server 400, which executes such authentication information issuance control, may be regarded as the control unit or second control unit of the disclosure. In the present embodiment, the center server 400 may be regarded as the authentication server of the disclosure.

Initially, in S201, it is determined whether there is a request to issue authentication information from the delivery user terminal 200. This issuance request includes a first issuance request for a package to be delivered (a request to issue authentication information corresponding to the first vehicle 10A) and a request to issue authentication information corresponding to the alternative vehicle (second vehicle 10B). The delivery user terminal 200 may make a request of the center server 400 via the delivery management server 500 to issue authentication information, or the delivery user terminal 200 may make a request of the center server 400 to issue authentication information directly without intervening the delivery management server 500. When affirmative determination is made in S201, the process proceeds to S202. When negative determination is made in S201, the authentication information issuance control is ended. When there is a request to issue authentication information, the control unit 402 of the center server 400 identifies the delivery user terminal 200 that is an issuance request source and the client user ID corresponding to the package to be delivered based on information included in the issuance request.

In S202, it is determined whether a signal from the delivery user terminal 200 includes a request to issue authentication information corresponding to an alternative vehicle. When affirmative determination is made in S202, the process proceeds to S203. When negative determination is made in S202, the process proceeds to S207. In S207, the first vehicle 10A is selected. The first vehicle 10A may be the vehicle 10 that the client user terminal 50 has specified as a place of delivery of a package in the center server 400 at the time when the client user submits a request to deliver the package, or may be the vehicle 10 that the center server 400 has selected from among the vehicles 10 associated with the client user ID and registered in the vehicle management information table. For example, all the vehicles 10 associated with the client user ID specified in S201 and registered in the vehicle management information table may be extracted based on the client user ID, the vehicle 10 of which the priority input to the priority field is the highest may be selected as the first vehicle 10A from among the vehicles 10. When there is only one vehicle 10 associated with the client user ID, it is assumed that the priority of the vehicle 10 is the highest.

In S203, it is determined whether there is an alternative vehicle (second vehicle 10B). That is, in the vehicle management information table, it is determined whether the vehicle 10 different from the first vehicle 10A to which the delivery user was supposed to deliver the package is associated with the same client user ID. When affirmative determination is made in S203, the process proceeds to S204. When negative determination is made in S203, the process proceeds to S206. In S206, it is difficult to deliver the package because there is no second vehicle 10B. In this case, the control unit 402 of the center server 400 transmits a signal indicating that there is no alternative vehicle to the delivery user terminal 200. The control unit 203 of the delivery user terminal 200 that has received the signal displays on the touch panel display that there is no alternative vehicle. On the other hand, in S204, the second vehicle 10B is selected. At this time, the control unit 402 of the center server 400 extracts all the vehicles 10 associated with the client user ID and registered in the vehicle management information table based on the client user ID identified in S201, and selects the vehicle 10 of which the priority input to the priority field is the highest as the second vehicle 10B from among the vehicles 10 other than the first vehicle 10A. In S205, the control unit 402 transmits, to the delivery user terminal 200, the vehicle information of the selected vehicle 10 together with the authentication information corresponding to the second vehicle 10B selected in S204 or the first vehicle 10A selected in S207.

Next, the operation of the delivery management system 1 at the time when authentication information has been issued to the delivery user terminal 200 through the authentication information issuance control shown in FIG. 7 will be described with reference to FIG. 8. Like step numbers denote the same processes in the flow of FIG. 8 as those of the flow of FIG. 6, and the description thereof is omitted. In the flow shown in FIG. 8, in order to deliver a package in accordance with a request for delivery from the client user, the delivery user terminal 200 makes a request of the center server 400 to issue authentication information before the delivery user reaches the vehicle 10 (the process of S51). This request includes the attribute information of the package, the client user ID, and the like. This issuance request includes a first issuance request for the package to be delivered (a request to issue authentication information corresponding to the first vehicle 10A) and a request to issue authentication information corresponding to the alternative vehicle (second vehicle 10B). This request may be submitted to the center server 400 via the delivery management server 500.

As the center server 400 receives a request to issue authentication information from the delivery user terminal 200, the center server 400 executes the authentication information issuance control shown in FIG. 7 (the process of S52). By executing the authentication information issuance control, the center server 400 issues authentication information of the intended vehicle 10. In S53, the center server 400 transmits the authentication information and the vehicle information to the delivery user terminal 200. The vehicle information is information for allowing the delivery user to find the second vehicle 10B as in the case of the vehicle management information shown in FIG. 4. The following processes of S17, S18, S21 to S24, and S31 to S35 are the same as those of the flow shown in FIG. 6, so the description thereof is omitted.

As the delivery user inputs the status that delivery has completed in S36, the latest delivery status is transmitted from the delivery user terminal 200 to the center server 400 (the process of S61). The delivery status may be transmitted to the center server 400 via the delivery management server 500. In the center server 400 that has received the latest delivery status, the control unit 402 updates the delivery information (the process of S62). For update of the delivery status, instead of inputting information for the update by the delivery user, as the delivery user terminal 200 receives a lock notification from the key unit 100, the delivery user terminal 200 may subsequently output an update instruction to the center server 400 such that the delivery status becomes completion of delivery. When the authentication information used by the delivery user terminal 200 for this delivery is a one-time key, the authentication information acquired in S53 may be invalidated at the timing at which the delivery user terminal 200 has received a lock notification in the process of S35. That is, the authentication information stored in the memory of the delivery user terminal 200 may be erased from the delivery user terminal 200 at the timing at which the delivery user terminal 200 has received a lock notification.

As the delivery information is updated in S62, the center server 400 transmits, to the client user terminal 50, a signal that indicates information about the vehicle 10 to which the package has been delivered (the process of S63). This indication is performed by the control unit 402 of the center server 400. In this case, the control unit 402 that transmits the signal may be regarded as the control unit of the disclosure. As the control unit 52 of the client user terminal 50 receives the vehicle information, the control unit 52 displays the vehicle information on the touch panel display (input/output unit 53) (the process of S64). Based on the vehicle information, the client user is allowed to identify the vehicle 10 to which the package has been delivered. The processes of S63 and S64 may be executed only when the package has been delivered to the second vehicle 10B.

As described above, according to the present embodiment, even when it becomes difficult to deliver a package to an initially scheduled vehicle 10 because the vehicle 10 has moved before the package is delivered to the vehicle 10, it is possible to select an alternative vehicle, so it is possible to increase an opportunity to deliver a package.

What is claimed is:

1. An authentication information providing server, comprising:
    a processor configured to issue authentication information corresponding to lock and unlock devices, each of the lock and unlock devices being configured to lock or unlock a corresponding one of predetermined compartments of a plurality of vehicles;
    the processor being configured to issue the authentication information corresponding to a second one of the plurality of vehicles when there is a request from a delivery user terminal to set a place of delivery of a package to a vehicle different from a first one of the plurality of vehicles, corresponding to the authentication information issued first by the processor, the second one of the plurality of vehicles being different from the first one of the plurality of vehicles; and
    the processor being configured to inform a terminal that is used by a recipient that the package has been delivered to the second one of the plurality of vehicles.

2. The authentication information providing server according to claim 1, wherein one of the predetermined compartments is at least one of a luggage compartment of each of the vehicles and a passenger compartment of each of the vehicles.

3. An authentication information providing method comprising:
    issuing, by the authentication information providing server authentication information corresponding to lock and unlock devices, each of lock and unlock device is configured to lock or unlock a corresponding one of predetermined compartments of a plurality of vehicles;
    issuing, by the authentication information providing server, the authentication information corresponding to a second one of the plurality of vehicles when there is a request from a delivery user terminal to set a place of delivery of a package to a vehicle different from a first one of the plurality of vehicles, corresponding to the authentication information issued first, the second one of the plurality of vehicles being different from the first one of the plurality of vehicles; and
    informing, by the authentication information providing server, to a terminal that is used by a recipient that the package has been delivered to the second one of the plurality of vehicles.

* * * * *